(12) United States Patent
Miyanaga

(10) Patent No.: US 9,162,371 B2
(45) Date of Patent: Oct. 20, 2015

(54) DRILL BIT

(75) Inventor: Masaaki Miyanaga, Hyogo (JP)

(73) Assignee: Kabushiki Kaisha Mayanaga, Hyogo (JP)

( * ) Notice: Subject to any disclaimer, the term of this patent is extended or adjusted under 35 U.S.C. 154(b) by 441 days.

(21) Appl. No.: 13/696,641

(22) PCT Filed: Apr. 19, 2011

(86) PCT No.: PCT/JP2011/002276
§ 371 (c)(1),
(2), (4) Date: Dec. 10, 2012

(87) PCT Pub. No.: WO2011/145270
PCT Pub. Date: Nov. 24, 2011

(65) Prior Publication Data
US 2013/0266386 A1   Oct. 10, 2013

(30) Foreign Application Priority Data

May 21, 2010  (JP) ................................. 2010-117261

(51) Int. Cl.
*B23D 1/14* (2006.01)
*B28D 1/14* (2006.01)
(Continued)

(52) U.S. Cl.
CPC ............... *B28D 1/146* (2013.01); *B23B 51/00* (2013.01); *E21B 10/602* (2013.01);
(Continued)

(58) Field of Classification Search
None
See application file for complete search history.

(56) References Cited

U.S. PATENT DOCUMENTS 1,851,261 A * 3/1932 Pechacek ......................... 279/97
2,045,725 A * 6/1936 Richardson ................... 175/394
(Continued)

FOREIGN PATENT DOCUMENTS

CN       1232740 A    10/1999
DE       7908923 U1    3/1980
(Continued)

OTHER PUBLICATIONS

English Translation of Search Report.
(Continued)

*Primary Examiner* — John Kreck
(74) *Attorney, Agent, or Firm* — The Ollila Law Group LLC

(57) ABSTRACT

An object is to provide a drill bit with improved strength of joint between a bit tip and a bit shaft without diminishing dust suction performance of the drill bit. A drill bit 1 includes: a bit tip 3 including at least three cutting edge portions arranged at the distal end of the bit tip 3 such that they are spaced apart from each other in a circumferential direction, each cutting edge portion 3c having a rake face 3s and a relief face 3e forming a joint ridge L1 serving as a cutting edge; and a bit shaft 2 having a distal end face 2F welded to a proximal end face of the bit tip 3 such that the bit shaft 2 rotates integrally with the bit tip 3. The bit shaft 2 includes a dust suction passage 4 extending in the longitudinal direction of the bit shaft 2, such that the distal end of the dust suction passage 4 extends to a distal end portion of the bit shaft. A dust suction auxiliary passage 6 is formed at the distal end portion of the bit shaft 2, such that the dust suction auxiliary passage 6 extends from the dust suction passage 4 orthogonally or substantially orthogonally to the dust suction passage 4, and a radially outer end 6t of the dust suction auxiliary passage 6 is open at an outer peripheral face 1F of the bit shaft 2. A proximal end portion 3b of the bit tip 3 is integrally attached to the distal end face of the bit shaft 2.

3 Claims, 7 Drawing Sheets

(51) Int. Cl.
*E21B 10/60* (2006.01)
*B23B 51/00* (2006.01)

(52) U.S. Cl.
CPC ...... *B23B 2226/75* (2013.01); *B23B 2251/205* (2013.01); *B23B 2251/282* (2013.01); *B23B 2270/62* (2013.01); *Y10T 408/455* (2015.01)

(56) References Cited

U.S. PATENT DOCUMENTS

| | | | | |
|---|---|---|---|---|
| 2,365,941 | A | * | 12/1944 | Crake ............ 175/393 |
| 3,163,246 | A | * | 12/1964 | Vagins et al. ............ 175/420.1 |
| 3,760,894 | A | * | 9/1973 | Pitifer ............ 175/413 |
| 4,294,319 | A | * | 10/1981 | Guergen ............ 175/389 |
| 4,313,506 | A | | 2/1982 | O'Connell |
| 4,515,230 | A | * | 5/1985 | Means et al. ............ 175/420.1 |
| 6,065,908 | A | | 5/2000 | Kleine et al. |
| 8,960,336 | B2 | * | 2/2015 | Kersten et al. ............ 175/415 |
| 2009/0217482 | A1 | | 9/2009 | Miyanaga |

FOREIGN PATENT DOCUMENTS

| | | |
|---|---|---|
| JP | 09272118 A | 10/1997 |
| JP | 1177662 A | 3/1999 |
| JP | 11291235 A | 10/1999 |
| JP | 2009196018 A | 3/2009 |
| JP | 2010201733 A | 9/2010 |
| WO | 2007032084 A1 | 3/2007 |

OTHER PUBLICATIONS

Office Action.

* cited by examiner

DRILL BIT

TECHNICAL FIELD

The present invention relates to a drill bit for use in drilling a hole into concrete, stone, or the like, and more particularly relates to a drill bit suitable for drilling an anchor bolt hole.

BACKGROUND ART

Conventionally, a drill bit has been used as a hole drilling tool in the case of drilling a hole into concrete, stone, or the like.

There are cases where such a drill bit is used for drilling a so-called "anchor bolt hole" into a concrete surface.

Swarf and the like in the "anchor bolt hole" need to be removed as much as possible so that a certain level of strong resistance to drawing force can be obtained for a metal anchor bolt to be implanted into the hole.

Accordingly, after drilling the "anchor bolt hole", so-called "dirt (chips) removal work" to remove swarf and the like from the inside of the hole needs to be performed. That is, in order to allow the anchor bolt to exert its predetermined function, the swarf and the like remaining in the anchor bolt hole are required to be removed before the anchor bolt is implanted into the hole.

Therefore, in conventional cases, after an anchor bolt hole is drilled by a drill bit, a dust collector's cleaning nozzle having its proximal end connected to a suction port of the collector is inserted into the anchor bolt hole, and swarf and other dirt are sucked and removed from the inside of the hole. One of such type of dust collectors is, for example, a dust collector provided by the applicant of the present application (Patent Literature 1).

There is a case where, at the time of hole drilling work, a drill bit is used which has a dust suction hole (dust suction passage) formed at the center of the drill bit tip for the purpose of collecting chips and the like produced at the drill bit tip at the same time as performing the hole drilling work. The structure of the drill bit provided with the dust suction hole is such that two cutting edge portions are formed at the drill bit tip, that is, the cutting edge portions are arranged to be spaced apart from each other with an angle of 180 degrees between them. Specifically, a dust suction hole having a greater diameter than the width of the cutting edge portions is formed in the shaft center of the bit shaft of the drill bit, and an opening at the distal end of the dust suction hole is partially and distally exposed at a position between the cutting edge portions (Patent Literature 2)

CITATION LIST

Patent Literature

PTL 1: International Publication No. WO2007/032084
PTL 2: Japanese Laid-Open Patent Application Publication No. HEI.11-77662

SUMMARY OF INVENTION

Technical Problem

However, if the drill bit is provided with three or more cutting edge portions, the above-described structure cannot be adopted. Specifically, if a dust suction hole is formed in the bit shaft so as to have such a large diameter as to allow the dust suction hole's opening at its distal end to be distally exposed even partially between cutting edge portions, then the thickness of the wall of the bit shaft in the radial direction becomes thin, which creates a concern about reduced strength. Particularly in the case of such a drill bit, the drill bit drills a hole by rotating while giving impulsive force in an axial direction at certain intervals, and therefore, damage due to buckling or the like may occur if the thickness of the wall of the bit shaft is thin.

Further, in the case of a drill bit having such a structure that the bit shaft is integrally welded to the proximal end of the bit tip and the bit tip includes cutting edge portions at its distal end, if the diameter of the dust suction hole is simply and uniformly increased as described above, then the area of a joint (the area of a welded portion) between the bit tip and the bit shaft is reduced. As a result, the joining strength at the joint (the welded portion) may become insufficient, in which case there is a concern that the drill bit may not be durable enough for long term use.

If the diameter of the dust suction hole is made small intending to solve the above-described problem, then the area of the opening exposed at the distal end of the dust suction hole becomes insufficient, resulting in a low dust suction effect.

The present invention has been made in view of the above. An object of the present invention is to provide a drill bit that solves the above-described conflicting technical problems.

Solution to Problem

A drill bit according to the present invention includes: a bit tip including at least three cutting edge portions which are arranged radially in a circumferential direction at a distal end of the bit tip, each cutting edge portion having a rake face and a relief face forming a joint ridge serving as a cutting edge; and a bit shaft having a distal end face welded to a proximal end face of the bit tip such that the bit shaft rotates integrally with the bit tip. The bit shaft includes a dust suction passage extending in a longitudinal direction of the bit shaft, such that a distal end of the dust suction passage extends to a distal end portion of the bit shaft and a proximal end of the dust suction passage is in communication with a suction device. A dust suction auxiliary passage is formed at the distal end portion of the bit shaft or at a proximal end portion of the bit tip, such that the dust suction auxiliary passage extends from the dust suction passage in a radially outward direction orthogonally or substantially orthogonally to the dust suction passage, and a radially outer end of the dust suction auxiliary passage is open at an outer peripheral face of the drill bit. The proximal end portion of the bit tip is integrally attached to the distal end face of the bit shaft.

According to the drill bit of the present invention having the above structure, dust such as swarf (chips) produced due to cutting by the cutting edge portions is sucked from the drill bit tip into the drill bit through: a gap between the drill bit and an inner peripheral face of a drilled hole; and the opening of the radially outer end of the dust suction auxiliary passage. Inside the drill bit, the dust is sucked into the dust suction passage through the dust suction auxiliary passage, and then discharged into the suction device. As a result, dust such as concrete dust produced due to the cutting is efficiently sucked into the dust suction passage without causing the dust to spread to the outside from the hole drilled by the drill bit. Accordingly, if the proximal end side of the dust suction passage is connected to a suction port of the suction device by a hose or the like, then almost no dust or the like remains in the drilled hole after the drilling. Therefore, after the hole is drilled, an anchor bolt can be directly implanted into the hole.

According to the drill bit having the above structure, the dust suction passage is formed to extend through a central portion of the bit shaft in the longitudinal direction such that the dust suction passage connects, at its distal end, to the dust suction auxiliary passage which extends orthogonally or substantially orthogonally to the dust suction passage. Accordingly, the area of a joint between the distal end face of the bit shaft and the proximal end face of the bit tip can be obtained sufficiently, and also, the area of the cross section of the dust suction passage and the area of the cross section of the dust suction auxiliary passage can be made sufficiently large.

Consequently, a drill bit with improved strength of joint between the bit shaft and the bit tip can be provided without diminishing high dust suction performance.

In the above drill bit, the dust suction auxiliary passage may be formed as a groove-shaped passage at the distal end face of the bit shaft, such that the groove-shaped passage has a distal end opening; and the distal end opening, which is groove-shaped, may be closed by the proximal end face of the bit tip, such that the radially outer end of the dust suction auxiliary passage is open at an outer peripheral face of the bit shaft. If such a structure is adopted, the dust suction passage can be readily formed by hole drilling using a drilling machine or the like, and the dust suction auxiliary passage can be readily formed by grooving using a milling machine or the like.

In addition, the bit tip and the bit shaft are such that the area of contact between the proximal end face of the bit tip and the distal end face of the bit shaft can be made relatively large. Accordingly, when the bit tip and the bit shaft are joined by electric welding or braze welding (or joined by using an adhesive), the area of the welding (the area of the joining) can be made large, which consequently makes it possible to firmly attach the bit tip to the bit shaft.

If the above-described structure is adopted in which the radially outer end of the dust suction auxiliary passage is open at the outer peripheral face of the bit shaft, then dust such as chips adhered to the inner peripheral face of the drilled hole can be effectively sucked from the inner peripheral face. Moreover, if the dust suction auxiliary passage is blocked by chips or the like, the chips or the like can be readily removed by inserting a stick or the like into the dust suction auxiliary passage.

Further, in the above drill bit, the dust suction auxiliary passage may be formed to have a curved shape, such that its radially outer end side is positioned more forward, in a rotation direction of the drill bit, than its radially inner end side. Such a structure is more preferable for a drill bit having a dust suction function since the structure makes it possible to more effectively suck dust from the distal end of the dust suction auxiliary passage when the drill bit rotates at the time of hole drilling.

Still further, in the above drill bit, a recess having a shape corresponding to a shape of the proximal end face of the bit tip, the recess accommodating the proximal end portion of the bit tip, may be formed at the distal end face of the bit shaft. Adopting such a structure makes it possible to further increase the area of the contact between the proximal end face of the bit tip and the distal end face of the bit shaft. As a result, the bit tip can be more firmly attached to the bit shaft. In particular, when the above structure in which "the recess accommodating the proximal end portion of the bit tip" is adopted, great joint strength can be obtained against external force exerted from every direction, because in the adopted structure, joining force (welding force) is exerted on portions that are attached in the longitudinal direction of the drill bit and on portions that are joined in a direction orthogonal to the longitudinal direction, and the joining force (welding force) is exerted in respective directions that are different from each other by substantially 90 degrees.

Advantageous Effects of Invention

According to the present invention having the above-described structure, the drill bit including three or more cutting edge portions radially formed at its distal end provides high dust suction performance at the drill bit tip when performing hole drilling work, and also, the drill bit is excellent in terms of durability and capable of transmitting a high rotational torque.

DESCRIPTION OF EMBODIMENTS

Hereinafter, embodiments of the present invention are described in more detail with reference to the drawings.

Embodiments

Figure 1:
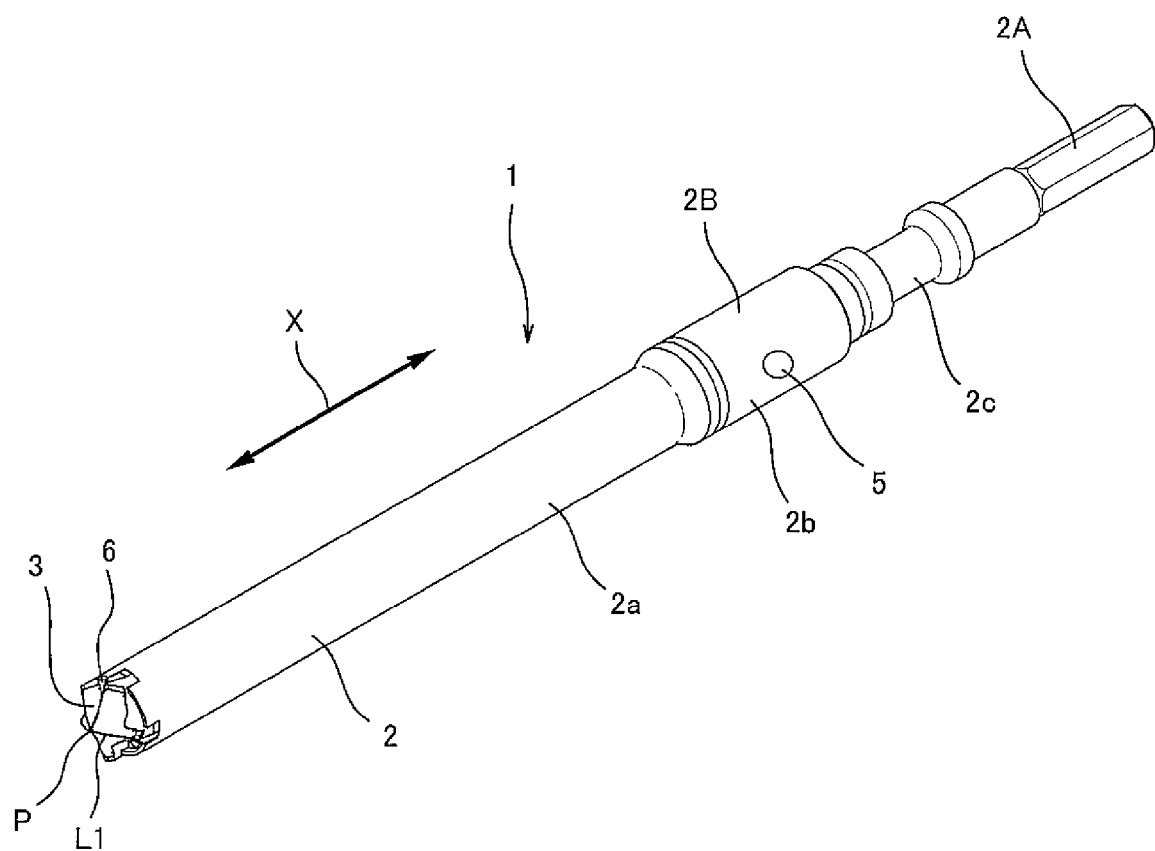
FIG. 1 is an overall perspective view showing the overall structure of a drill bit according to one embodiment of the present invention.

As shown in FIG. 1, a drill bit 1 according to the present embodiment mainly includes a bit shaft 2 positioned at the proximal end side of the drill bit 1 and a bit tip 3 integrally formed with the distal end side of the bit shaft 2.

The bit shaft 2 includes a shank 2A and a shaft main part 2B. The shank 2A has a regular hexagonal cross section at its proximal end portion to which a chuck 10c (see FIG. 10) of an electric drill 10 (see FIG. 10) is attached. The shaft main part 2B has a round cross section at its distal end side, and the external diameter of the shaft main part 2B varies at its respective portions in the longitudinal direction.

Figure 11:
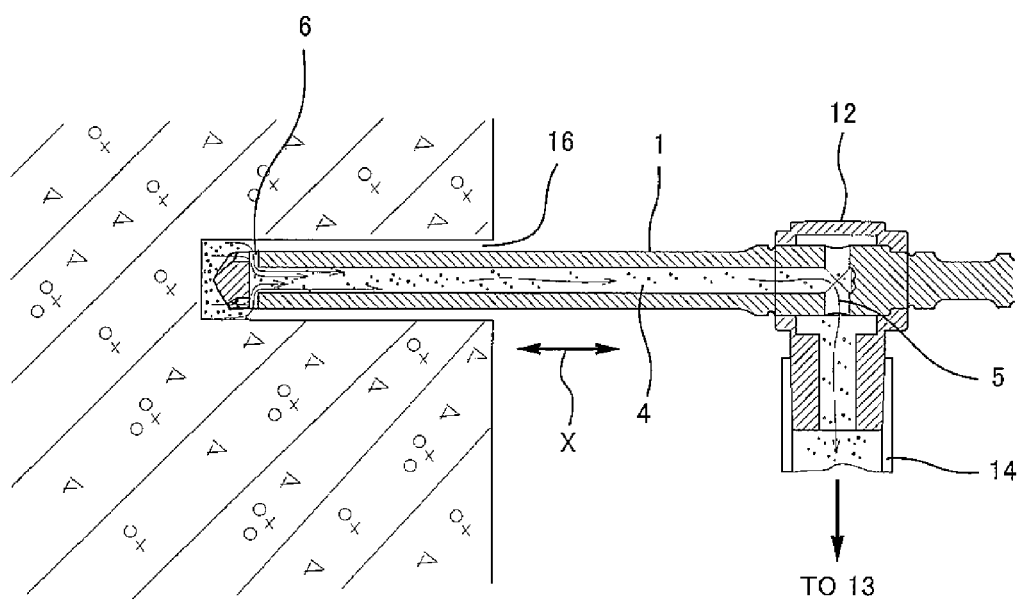
FIG. 11 is a partially enlarged view of FIG. 10, the view showing a state where the dust suction is performed at the distal end portion of the drill bit shown in FIG. 10.

The shaft main part 2B includes a shaft distal end portion 2a, a rotation support 2b, and an elongated portion 2c. The shaft distal end portion 2a, which has a uniform diameter, extends from the distal end portion of the shaft main part 2B toward the proximal end side of the shaft main part 2B slightly beyond the central portion of the shaft main part 2B. The rotation support 2b, which has a slightly greater diameter than that of the shaft distal end portion 2a, is adjacent to the proximal end side of the shaft distal end portion 2a. The elongated portion 2c, the diameter of which varies (i.e., being different) at its respective portions in the longitudinal direction, is adjacent to the proximal end side of the rotation support 2b and the proximal end of the elongated portion 2c is integrally connected to the shank 2A. As shown in FIG. 11, the shaft distal end portion 2a has, at the center of its round transverse cross section, a dust suction passage 4 (see FIG. 11) extending in the longitudinal direction X (see the direction of arrow X in FIG. 11) of the drill bit 1.

As shown in FIG. 11, the proximal end of the dust suction passage 4 is connected to a dust suction connecting passage 5. The dust suction connecting passage 5 is formed in the rotation support 2b in a manner to extend radially with respect to the round transverse cross section.

Figure 4:
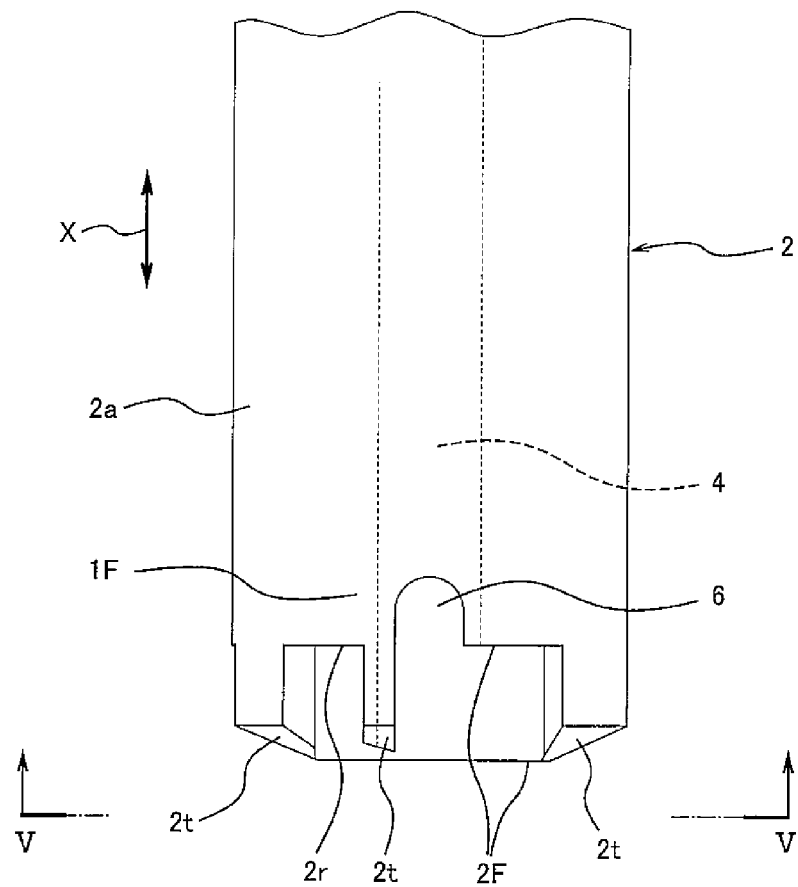
FIG. 4 is a partial side view showing a structure of a distal end portion of a bit shaft of the drill bit shown in FIG. 2.
Figure 5:
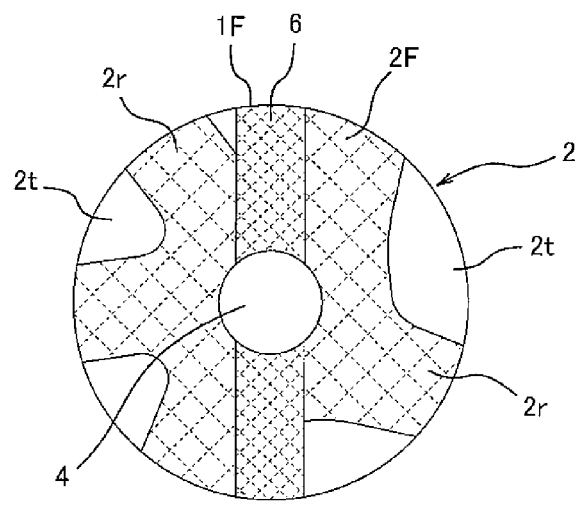
FIG. 5 is a view showing a structure of the distal end portion of the bit shaft of the drill bit shown in FIG. 4, the view being seen in the direction of arrows of line V-V in FIG. 4.

On the other hand, as shown in FIG. 4 and FIG. 5, the distal end of the dust suction passage 4 extends to a distal end face 2F of the bit shaft 2, and is open at the distal end face 2F.

As shown in FIG. 4, a dust suction auxiliary passage 6 is formed such that the dust suction auxiliary passage 6 has its central portion on the dust suction passage 4 which is open at the distal end face 2F of the bit shaft 2, and such that the dust suction auxiliary passage 6 extends in radial directions (i.e., in a diametrical direction) orthogonally to the dust suction passage 4. The dust suction auxiliary passage 6 is formed in a groove (groove-like) shape, such that radially outer ends of the dust suction auxiliary passage 6 are open at an outer peripheral face 1F of the drill bit 1.

In the present embodiment, the dust suction auxiliary passage 6 is formed orthogonally to the longitudinal direction X (i.e., orthogonally to the dust suction passage 4) as shown in FIG. 4, FIG. 5, or FIG. 11. However, as an alternative, the dust suction auxiliary passage 6 may be formed substantially orthogonally to the longitudinal direction X (specifically, substantially orthogonally with an inclination of approximately 5 to 15 degrees).

As shown in FIG. 5, the dust suction auxiliary passage 6 is connected, at its central portion in the longitudinal direction (i.e., in the diametrical direction of the drill bit 1), to the dust suction passage 4.

Figure 7:
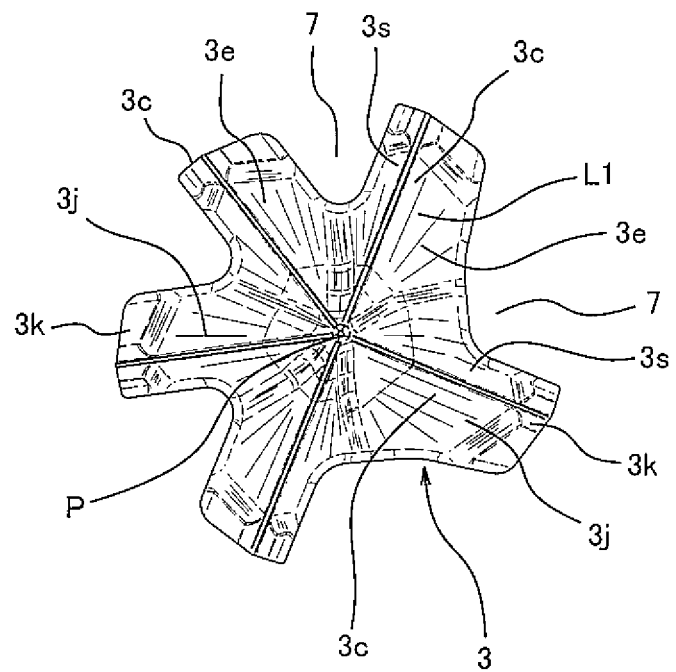
FIG. 7 is a view showing a structure of the bit tip shown in FIG. 6, the view being seen in the direction of arrows of line VII-VII in FIG. 6.
Figure 8:
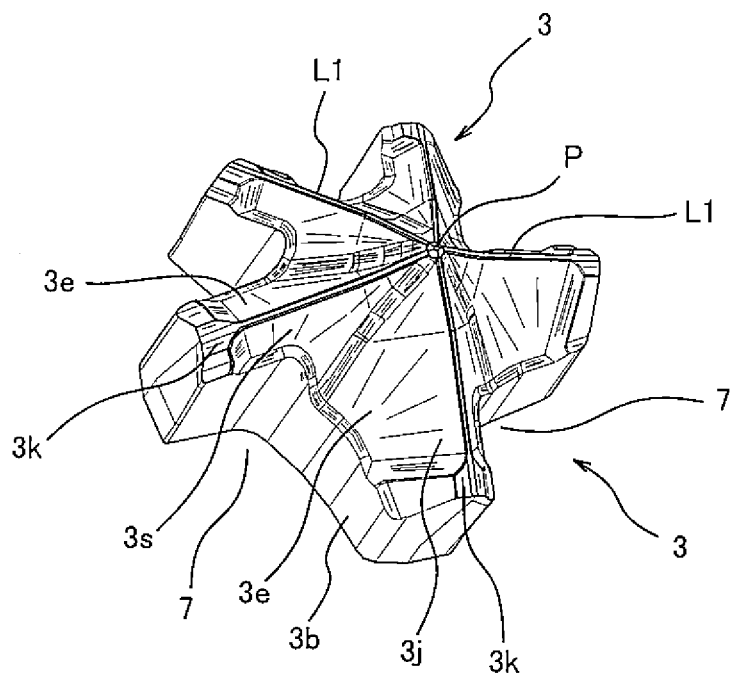
FIG. 8 is a perspective view showing a structure of the bit tip shown in FIG. 6 and FIG. 7, the perspective view being seen diagonally from the distal end side.
Figure 9:
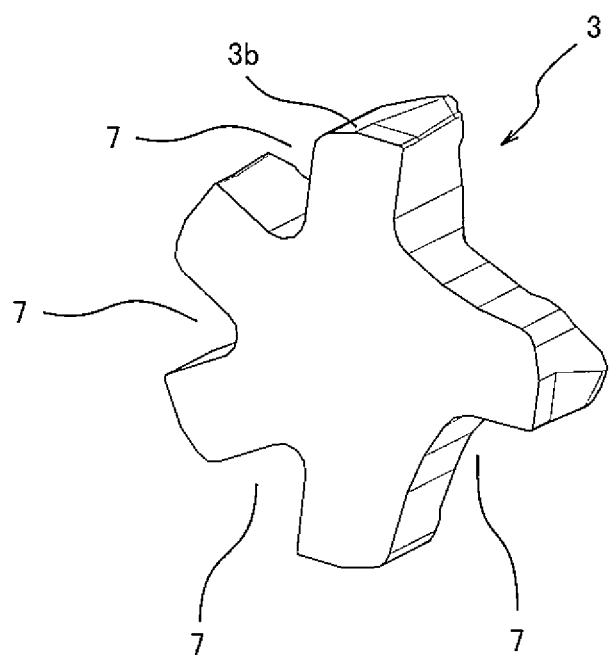
FIG. 9 is a perspective view showing a structure of the bit tip shown in FIG. 6 and FIG. 7, the perspective view being seen diagonally from behind (i.e., diagonally from the proximal end side).

In the present embodiment, as shown in FIG. 4 and FIG. 5, a "recess 2r" is formed (see FIG. 4 and FIG. 5) at the distal end face 2F of the bit shaft 2, the recess 2r having a shape substantially corresponding to the shape of a flat proximal end face 3F of the bit tip 3 shown in FIG. 7 and FIG. 9. That is, the recess 2r is a portion shown in FIG. 5 as a rough checkered pattern. Further, the dust suction auxiliary passage 6, which is recessed further than the recess 2r toward the proximal end side, is shown in FIG. 5 as a fine checkered pattern in the recess 2r.

Of the distal end face 2F of the bit shaft 2, a portion other than the recess 2r and the dust suction auxiliary passage 6 is formed as a tapered face 2t, which is tapered such that the closer to the center, the more protruding toward the distal end side. The tapered face 2t is partially exposed at the lower end in FIG. 4 (i.e., at the distal end of the drill bit 1).

Figure 3:
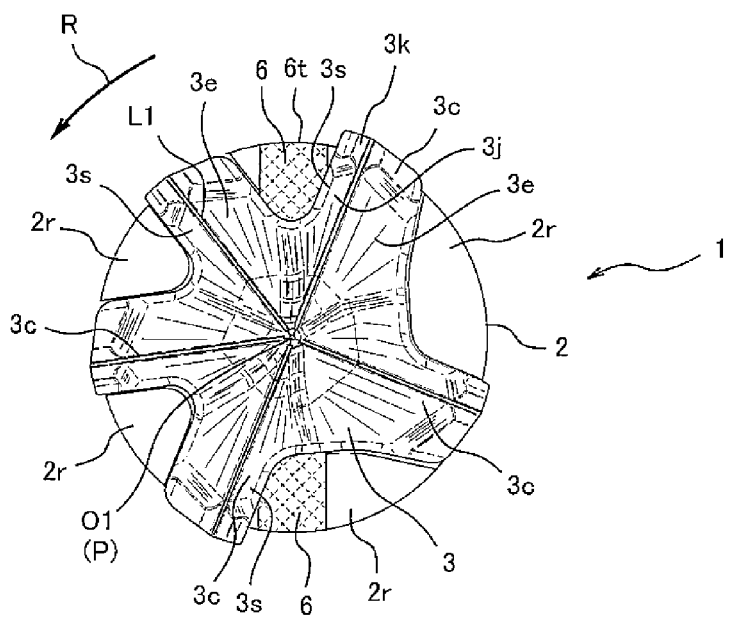
FIG. 3 is a bottom view of the distal end portion shown in FIG. 2, the bottom view being seen from the distal end side (i.e., seen in the direction of arrows of line III-III in FIG. 2).

As shown in, for example, FIG. 3 and FIG. 7, at least three cutting edge portions 3c arranged in a circumferential direction are radially formed at the distal end of the bit tip 3. In the case of the present embodiment, five cutting edge portions 3c are radially formed such that, when seen in bottom view, they are generally in a so-called "star shape", in which radially outer portions of the respective cutting edge portions 3c are spaced apart from each other in the circumferential direction and radially inner portions of the respective cutting edge portions 3c are placed together at the center of the drill bit 1. As shown in FIG. 3 or FIG. 7, out of the five cutting edge portions 3c, three adjacent cutting edge portions 3c (see the right half of FIG. 3) are arranged such that the space between adjacent cutting edge portions 3c in the circumferential direction has an angle of substantially 90 degrees, and four adjacent cutting edge portions 3c (positioned in substantially the left half of FIG. 3) are arranged such that the space between adjacent cutting edge portions 3c in the circumferential direction has an angle of substantially 60 degrees.

Each cutting edge portion 3c has a rake face 3s formed at its forward side with respect to a rotation direction R (see arrow R in FIG. 3), and has a relief face 3e formed at its backward side with respect to the rotation direction R. For each cutting edge portion 3c, a joint ridge L1 between the rake face 3s and the relief face 3e forms a cutting edge.

The radially inner ends of the cutting edges of the respective cutting edge portions 3c are joined together at the rotational center O1 of the drill bit 1 to form a pointed end, i.e., a chisel point P.

As shown in FIG. 7, when seen in bottom view, a substantially triangular gap 7 is formed between the relief face 3e of each cutting edge portion 3c and the rake face 3s of the adjacent cutting edge portion 3c that is positioned backward in the rotation direction. Accordingly, in the case of the present embodiment, the gap 7 is formed between every two adjacent cutting edge portions 3c of the five cutting edge portions 3c. As shown in FIG. 3, at each gap 7, the tapered face 2t and/or a radially outer end portion, including a radially outer end 6t, of the dust suction auxiliary passage 6 are exposed at the distal end side of the drill bit 1.

Figure 2:
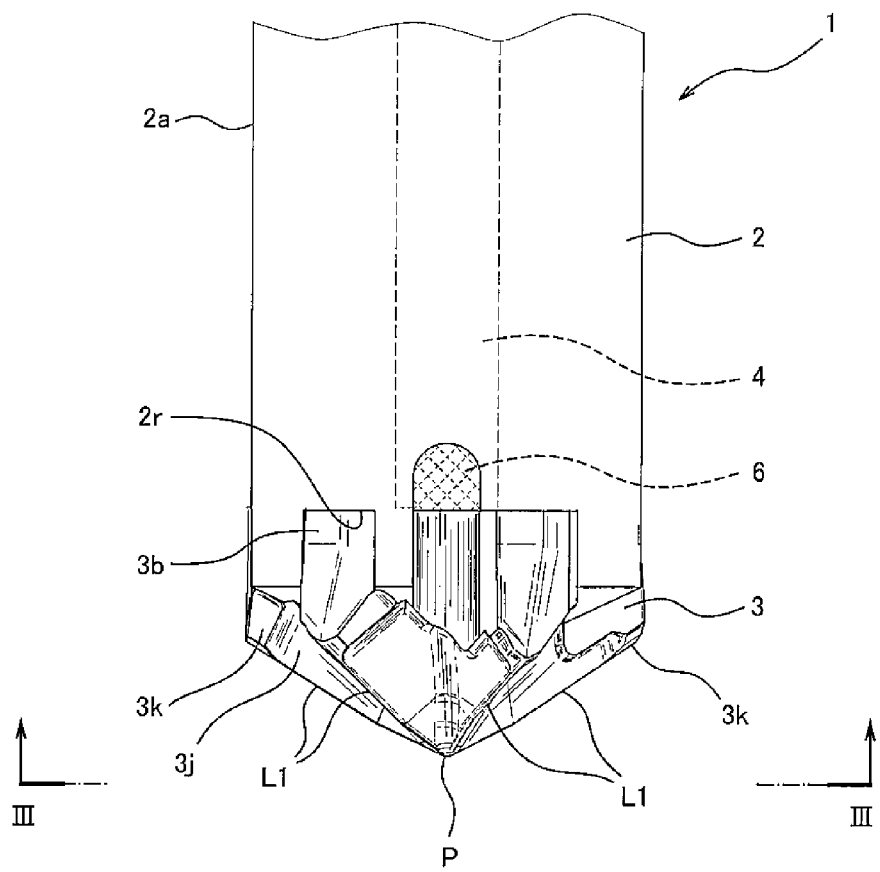
FIG. 2 is a partial side view showing in an enlarged manner a structure of a distal end portion of the drill bit according to the embodiment of the present invention, the partial side view being seen in a direction orthogonal to the longitudinal direction of the drill bit.
Figure 6:
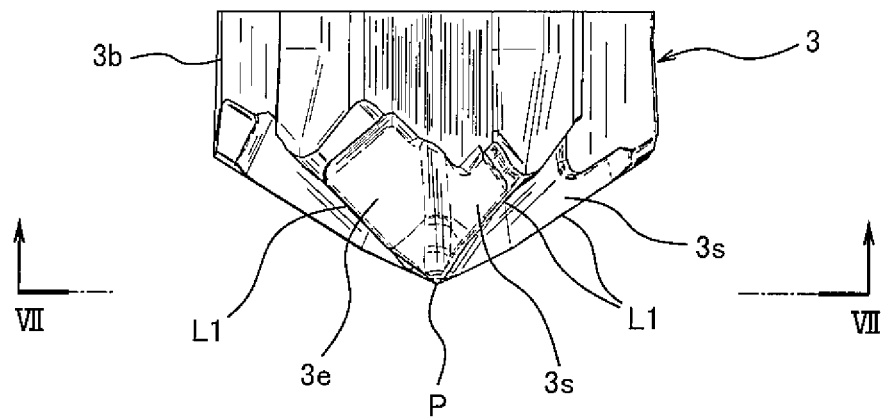
FIG. 6 is a partial side view showing a structure of a bit tip of the drill bit shown in FIG. 2, the partial side view showing a state where the bit tip is not yet attached to the bit shaft.

The bit tip 3 is attached to the bit shaft 2, such that a proximal end portion 3b (see FIG. 2 and FIG. 6) of the bit tip 3 is accommodated in the recess 2r of the bit shaft 2. That is, the proximal end portion 3b of the bit tip 3 is accommodated in the recess 2r of the distal end face 2F of the bit shaft 2, such that the proximal end portion 3b of the bit tip 3 is integrally joined to the distal end face 2F of the bit shaft 2 in such a state as shown in FIG. 2 where the bit tip 3 and the bit shaft 2 engage with each other and fit together with their projection and recess corresponding to each other.

In the present embodiment, the joining is performed by a method (a welding method) where the proximal end portion 3b and the distal end face 2F are welded together by using heat generated by electrical resistance. However, instead of the welding by electrical resistance, a different welding method such as braze welding may of course be used to join the proximal end portion 3b and the distal end face 2F together. Alternatively, welding using laser light may be used, for example. Further alternatively, the joining may be performed by using an adhesive.

As shown in FIGS. 2 and 3 or FIGS. 6 and 7, at the tip of the radially outer end portion of each cutting edge portion 3c, a reinforcing cutting edge portion 3k is formed, which has rake and relief angles less sharp than those of a portion positioned radially inward from the radially outer end portion. This structure prevents the radially outer end portion from becoming chipped when the impulsive force of hole drilling work is exerted on the radially outer end portion, and thus improves durability. Further, an adjustment face 3j is formed at an adjacent circumferential position radially inward from the reinforcing cutting edge portion 3k. The adjustment face 3j has rake and relief angles sharper than those of the adjacent reinforcing cutting edge portion 3k.

Figure 10:
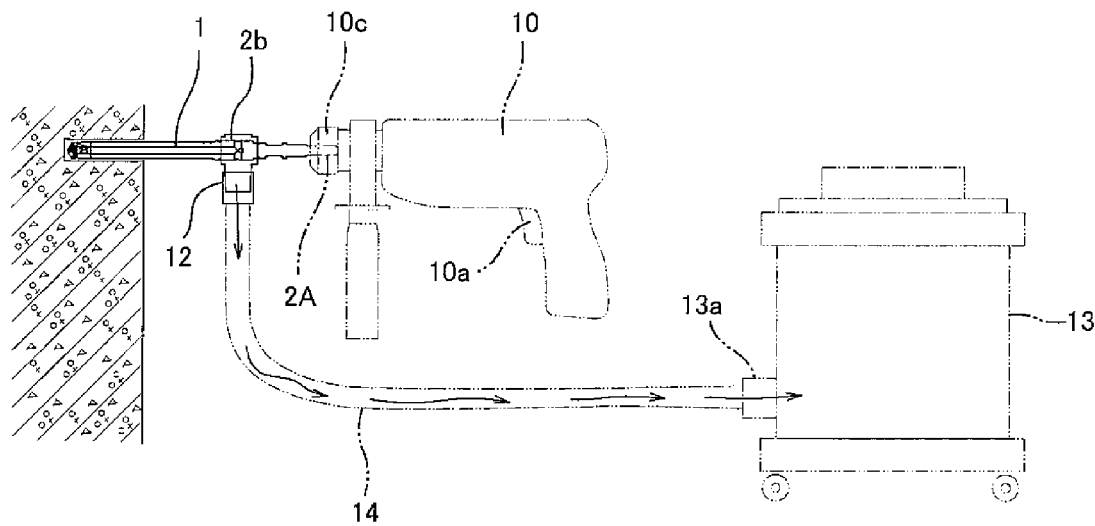
FIG. 10 is a schematic diagram showing a state where dust suction is performed when the drill bit shown in FIG. 1 is used to drill a hole.

As shown in FIG. 10, the drill bit 1 according to the present embodiment with the above-described structure, when drilling a hole into a workpiece such as concrete with the shank 2A attached to the chuck 10c of the electric drill (electric vibration drill) 10 capable of exerting rotating motion and vibrating motion in an axial direction (corresponding to the longitudinal direction), functions as described below. Specifically, as shown in FIG. 10, in a state where a suction port of a non-rotatable support holder 12 disposed at the rotation support 2b of the drill bit 1 is connected to a suction port 13a of a suction device 13 via a hose 14, a switch 10a of the electric drill 10 is operated to be ON. Accordingly, the electric drill 10 exerts the rotating motion and the axial vibrating motion on the drill bit 1. As a result, the drill bit 1 drills a hole into the workpiece. Due to the drilling, dust such as swarf (chips) is produced in the drilled hole. As shown in FIG. 11, such dirt is effectively sucked through openings formed at the distal end and radially outer ends of the dust suction auxiliary passage 6. In particular, as shown in FIG. 3, the dust suction auxiliary passage 6 has openings 6j which are distally open. Each opening 6j is formed so as to be positioned forward, in the rotation direction R, from the rake face 3s of one of the cutting edge portions 3c. Accordingly, dirt and the like scooped up by the rake faces 3s can be effectively sucked through the openings 6j. Such dirt and the like are also effectively sucked through the openings formed at the radially outer ends 6t of the dust suction auxiliary passage 6, which openings are formed at an outer peripheral face of the bit shaft 2.

Accordingly, as shown in FIG. 11, the dirt (dust) such as concrete dust produced in the drilled hole 16 due to the hole drilling work is efficiently sucked from the dust suction auxiliary passage 6 into the suction device 13 through the dust suction passage 4, the dust suction connecting passage 5, and the hose 14 without spreading to the outside of the drilled hole 16.

Therefore, after the hole drilling, there is no dust or the like remaining in the drilled hole 16. Thus, after the hole drilling is completed, an anchor bolt (not shown) can be directly implanted into the drilled hole 16.

In the case of the drill bit 1 according to the present embodiment, the proximal end portion 3b of the bit tip 3 is, at its proximal end side, fitted and three-dimensionally welded to the recess 2r formed at the distal end face 2F of the bit shaft 2. The area of the welding between these portions is large, and as a result, these portions are extremely firmly connected and integrated together.

Therefore, even if the rotating motion and the impulsive axial vibrating motion are exerted on the drill bit at the time of hole drilling, there is not a risk that the joint between the bit shaft 2 and the bit tip 3 becomes damaged or that the bit tip 3 drops from the bit shaft 2.

In the above-described embodiment, the groove-shaped dust suction auxiliary passage 6 is formed at the distal end face 2F of the bit shaft 2. However, as an alternative structure which is not shown, a cylindrical dust suction auxiliary passage 6 may be formed at a position that is shifted from the distal end face 2F toward the proximal end side. Such a structure is preferable since the structure allows the area of the joint between the bit tip 3 and the bit shaft 2 to be further increased.

As another embodiment which is not shown, the distal end face 2F of the bit shaft 2 may be formed as a flat face; the bit tip 3 may be formed to have a flat proximal end face; and the bit tip 3 may be welded to the distal end side of the bit shaft 2. Such a structure is preferable since the structure allows the distal end face of the bit shaft 2 to be processed more easily.

As yet another embodiment which is not shown, the dust suction auxiliary passage 6 may be formed at the bit tip 3, that is, the dust suction auxiliary passage 6 may be formed at the proximal end portion 3b, i.e., the proximal end face, of the bit tip. In the case of adopting such a structure, if the bit tip is made of a sintered alloy, then merely forming the dust suction auxiliary passage in a mold will suffice and the aforementioned grooving using a milling machine, or the like, becomes unnecessary. Thus, adopting this structure is preferred since the processing man-hours can be reduced and the fabrication becomes easier.

Figure 12:
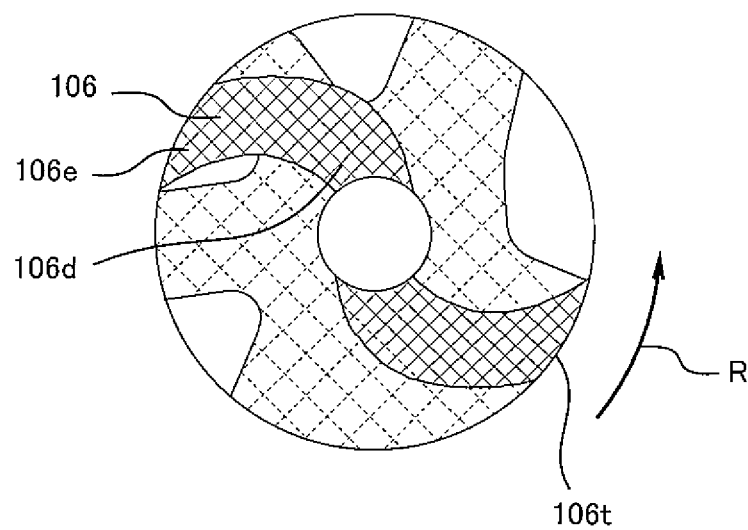
FIG. 12 shows a structure of the distal end portion of the bit shaft according to another embodiment in which a dust suction auxiliary passage is formed differently from the one shown in FIG. 5.

As yet another embodiment, instead of the structure shown in FIG. 5, a structure shown in FIG. 12 may be adopted, in which a dust suction auxiliary passage 106 is formed such that a radially outer end 106e side is positioned more forward in the rotation direction of a drill bit 101 (see the arrow R) than a radially inner end 106d side. In other words, in a case where the drill bit's rotation direction (see the arrow R) is counter-clockwise when the drill bit is seen from its distal end side, the dust suction auxiliary passage 106 may be substantially S-shaped when seen from its distal end side. Such a structure is preferable since the structure makes is possible to more effectively suck the dust such as chips from radially outer ends 106t of the dust suction auxiliary passage 106 when the drill bit 101 rotates at the time of hole drilling. Moreover, a structure capable of sucking the dust more effectively can be realized by additionally incorporating into the above structure the following feature as shown in FIG. 12: the width of the dust suction auxiliary passage 106 at the radially outer side is made wider than the width of the dust suction auxiliary passage 106 at the radially inner side. It should be noted that, in FIG. 12, components that are the same as or corresponding to those shown in FIG. 5 are denoted by reference signs that are obtained by adding 100 to the reference signs used in FIG. 5, and therefore, a description of such components is partly omitted.

In the above-described embodiment, the dust suction auxiliary passage is formed in the diametrical direction. That is, there are formed two dust suction auxiliary passages extending from the center. However, the number of dust suction auxiliary passages to be formed is not limited to two, but may be three, four, or more. The number of dust suction auxiliary passages to be formed may be increased or reduced depending on the number of cutting edge portions or desired dust suction performance.

It will be understood that the present invention is not limited to the above-described embodiment, and the present invention can be implemented with various modifications without departing from the fundamental technical spirit of the present invention.

INDUSTRIAL APPLICABILITY

The drill bit according to the present invention may be used in, for example, drilling a hole into a workpiece such as concrete, stone, a tile, or the like.

REFERENCE SIGNS LIST 1 drill bit
2 bit shaft
2F distal end face
3 bit tip
3b proximal end portion
3c cutting edge portion
3e relief face
3s rake face
4 dust suction passage
6 dust suction auxiliary passage
L1 joint ridge
X longitudinal direction

The invention claimed is:

1. A drill bit comprising:
a bit tip including at least three cutting edge portions which are arranged radially in a circumferential direction at a distal end of the bit tip, each cutting edge portion having a rake face and a relief face forming a joint ridge serving as a cutting edge; and a bit shaft having a distal end face integrally attached to a proximal end face of the bit tip such that the bit shaft rotates integrally with the bit tip,
wherein the bit shaft includes a dust suction passage extending in a longitudinal direction of the bit shaft, such that a distal end of the dust suction passage extends to a distal end portion of the bit shaft and a proximal end of the dust suction passage is in communication with a suction device;
wherein the distal end portion of the bit shaft includes a dust suction auxiliary passage, such that the dust suction auxiliary passage extends from the dust suction passage in a radially outward direction orthogonally to the dust suction passage, and a radially outer end of the dust suction auxiliary passage is open at an outer peripheral face of the bit shaft;
wherein the dust suction auxiliary passage is formed in such a manner that a groove is formed at the distal end face of the bit shaft, the groove having a portion opening at the distal end of the bit shaft and a portion opening at the outer peripheral face of the bit shaft, and the portion opening at the distal end is blocked by the proximal end face of the bit tip; and
wherein a recess having a shape corresponding to a shape of the proximal end face of the bit tip and accommodating a proximal end portion of the bit tip is formed at the distal end face of the bit shaft such that, when the bit tip is accommodated in the recess, the groove is positioned between cutting edge portions that are adjacent to each other in a circumferential direction.

2. The drill bit according to claim 1, wherein the proximal end face of the bit tip is formed as a flat face;
wherein, of the distal end face of the bit shaft, a portion joined to the proximal end face of the bit tip is formed as a flat face;
wherein a part of the groove formed at the distal end face of the bit shaft is not blocked by the proximal end face of the bit tip; and
wherein the part that is not blocked by the proximal end face of the bit tip is adjacent to the rake face and opens at a position forward from the rake face in a rotation direction while facing straight the distal end of the bit shaft.

3. The drill bit according to claim 1 or claim 2, wherein the dust suction auxiliary passage is curved to be substantially S-shaped, such that its radially outer end side is positioned more forward, in a rotation direction of the drill bit, than its radially inner end side.

* * * * *